United States Patent
Su et al.

(10) Patent No.: US 9,141,459 B2
(45) Date of Patent: Sep. 22, 2015

(54) PRECURSOR ADAPTATION ALGORITHM FOR ASYNCHRONOUSLY CLOCKED SERDES

(71) Applicant: Oracle International Corporation, Redwood City, CA (US)

(72) Inventors: Jianghui Su, San Jose, CA (US); Pu Chuang, Santa Clara, CA (US); Yan Yan, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 90 days.

(21) Appl. No.: 14/146,904

(22) Filed: Jan. 3, 2014

(65) Prior Publication Data

US 2015/0193288 A1  Jul. 9, 2015

(51) Int. Cl.
*G06F 11/00* (2006.01)
*G06F 11/07* (2006.01)

(52) U.S. Cl.
CPC .................................. *G06F 11/076* (2013.01)

(58) Field of Classification Search
CPC ........... H04L 7/027; H04L 7/04; H04L 7/042; H04L 7/10; H04N 5/04
USPC .......................................................... 714/707
See application file for complete search history.

(56) References Cited

U.S. PATENT DOCUMENTS

| | | | |
|---|---|---|---|
| 6,728,326 B1 * | 4/2004 | Fulghum ........................ | 375/365 |
| 7,133,481 B2 * | 11/2006 | Azakami et al. ............... | 375/355 |
| 7,489,739 B2 * | 2/2009 | Dally ............................. | 375/316 |
| 7,782,932 B2 | 8/2010 | Payne et al. | |
| 7,869,379 B2 | 1/2011 | Connolly et al. | |
| 8,165,253 B2 * | 4/2012 | Abel et al. ..................... | 375/354 |
| 8,249,199 B2 | 8/2012 | Doblar et al. | |
| 8,300,684 B2 | 10/2012 | Mobin et al. | |
| 8,396,106 B2 | 3/2013 | Connolly et al. | |
| 8,443,243 B2 | 5/2013 | Matsumoto et al. | |
| 8,483,344 B2 | 7/2013 | Dillinger | |
| 2009/0028554 A1 * | 1/2009 | Anderson et al. ............... | 398/25 |
| 2013/0259104 A1 * | 10/2013 | Huostila et al. ............... | 375/224 |
| 2013/0297831 A1 * | 11/2013 | Laurentiu ........................ | 710/5 |

FOREIGN PATENT DOCUMENTS

EP  2451129  9/2012

* cited by examiner

*Primary Examiner* — David Ton
(74) *Attorney, Agent, or Firm* — Meyertons Hood Kivlin Kowert & Goetzel

(57) ABSTRACT

A system may include one or more high-speed serial interfaces for moving data. A system may include a transmission unit configured to serially transmit data bits, and a receiving unit coupled to the transmission unit. The receiving unit may receive a stream of data bits from the transmission unit and establish an initial sample point. The receiving unit may then sample the bits at multiple offsets from the initial sample point, reestablishing the initial sample point between each offset. The receiving unit may also calculate bit error rates (BERs) for the samples taken at each sample point. Based on the BERs, the receiving unit may set a data sampling point for receiving a second stream of data bits from the transmitter unit. The receiving unit may limit the amount of time the data sampling point is used and recalculate the data sampling point when the amount of time has expired.

20 Claims, 7 Drawing Sheets

Sample Set BER Examples

PRECURSOR ADAPTATION ALGORITHM FOR ASYNCHRONOUSLY CLOCKED SERDES

BACKGROUND OF THE INVENTION

1. Field of the Invention

This invention relates to high performance computing network systems, and more particularly, to clock and data recovery methods for systems using serialized data transmission.

2. Description of the Relevant Art

The performance of computing systems is dependent on both hardware and software. In order to increase the throughput of computing systems, the parallelization of tasks is utilized as much as possible. To this end, compilers may extract parallelized tasks from program code and hardware may include multiple copies of structures to execute the parallelized tasks. The structures may include functional units, processor cores, and nodes.

Communication between the multiple structures may utilize wide communication buses, i.e., buses that transport data words of 16-bits, 32-bits, 64-bits, or more in parallel. The physical implementation of such communication buses may consume significant area on an integrated circuit or system. Additionally, cross-capacitance, electromigration interference (EMI), and parasitic inductance on wide buses increase the power consumption and noise effects of the computing system. Such parasitic effects may become more pronounced with increased operational frequencies and reduced geometric dimensions of the wide buses themselves, bond wires, integrated circuit (IC) package leads, and external supply lines. Mismatch of impedance values at the end of transmission lines may result in reflection or ringing, increased propagation delays, and voltage droop of the signals being transmitted.

Reducing the problems with high-speed parallel data transmission may include serializing the parallel data at the transmission side before transmission and then de-serializing the transmitted data on the receiver side upon reception. A pair of Serializer and Deserializer (SERDES) circuits may be used for this purpose.

One way of further reducing communication lines and the associated issues is by eliminating a dedicated clock between individual SERDES circuits. If the individual SERDES circuits are the same circuit board, they may share a clock source and therefore may not require a clock signal from one SERDES circuit to the other. However, if the SERDES circuits are far apart on the circuit board or are not on the same board, then a method for transmitting a clock signal from the transmitting circuit to the receiving circuit is required. One method for transmitting a clock signal is to embed the clock signal within the data stream.

Recovering an embedded clock may present difficulties. Data may be encoded such that a minimum number of data state transitions occur for a given number of bits transmitted. The receiving unit may require an accurate clock to begin with and this clock source may need to be capable of fine tune adjustments in order to match the transmitting circuit's clock if data rates above a gigabit per second (Gbit/s) are to be reliably achieved.

Another challenge may arise from intentional variations of the transmitting circuit's data clock. A data clock may be modulated within a known range in a method known as Spread Spectrum Clocking (SSC). SSC may be utilized to prevent EMI emissions in a single frequency spectrum. By gradually moving the transmitter frequency between two set frequencies, EMI emissions are spread across a wider frequency spectrum such that no single frequency is impacted for long. While SSC has benefits of reducing EMI noise, it may create a challenge for recovering the data clock.

SUMMARY OF THE EMBODIMENTS

Systems and methods for improving the reliability and accuracy of clock and data recovery within systems using serialized data transmission are contemplated. In one embodiment, a computing system may include a host processor, a transmission unit coupled to the host processor and configured to receive data from the host and to transmit data bit streams based on the received data, and a receiving unit coupled to the transmission unit. The receiving unit may be configured to receive a stream of data bits from the transmission unit, and determine a sampling point for each of a series of offsets, thereby creating a series of sampling points. The receiving unit may also be configured to sample at least some of the data bits at each of the series of sampling points, thereby creating a series of sample sets corresponding to each of the sampling points. The receiving unit may determine a Bit Error Rate (BER) for each sample set from each sampling point. The receiving unit may then determine a data sampling point based on the determined BER for each one of the series of sample sets.

In another embodiment of the system, the receiving unit may be further configured to measure the time from the beginning of the reception of a second stream of data bits and recalculate the data sampling point after a predetermined amount of time expires. In further embodiments, the predetermined amount of time may be adjusted based upon data from sensors located within the system. In other embodiments, to recalculate the data sampling point, the receiving unit may also be configured to receive a third stream of data bits and repeat the sampling process using the series of offsets.

These and other embodiments will become apparent upon reference to the following description and accompanying drawings.

Figure 1:
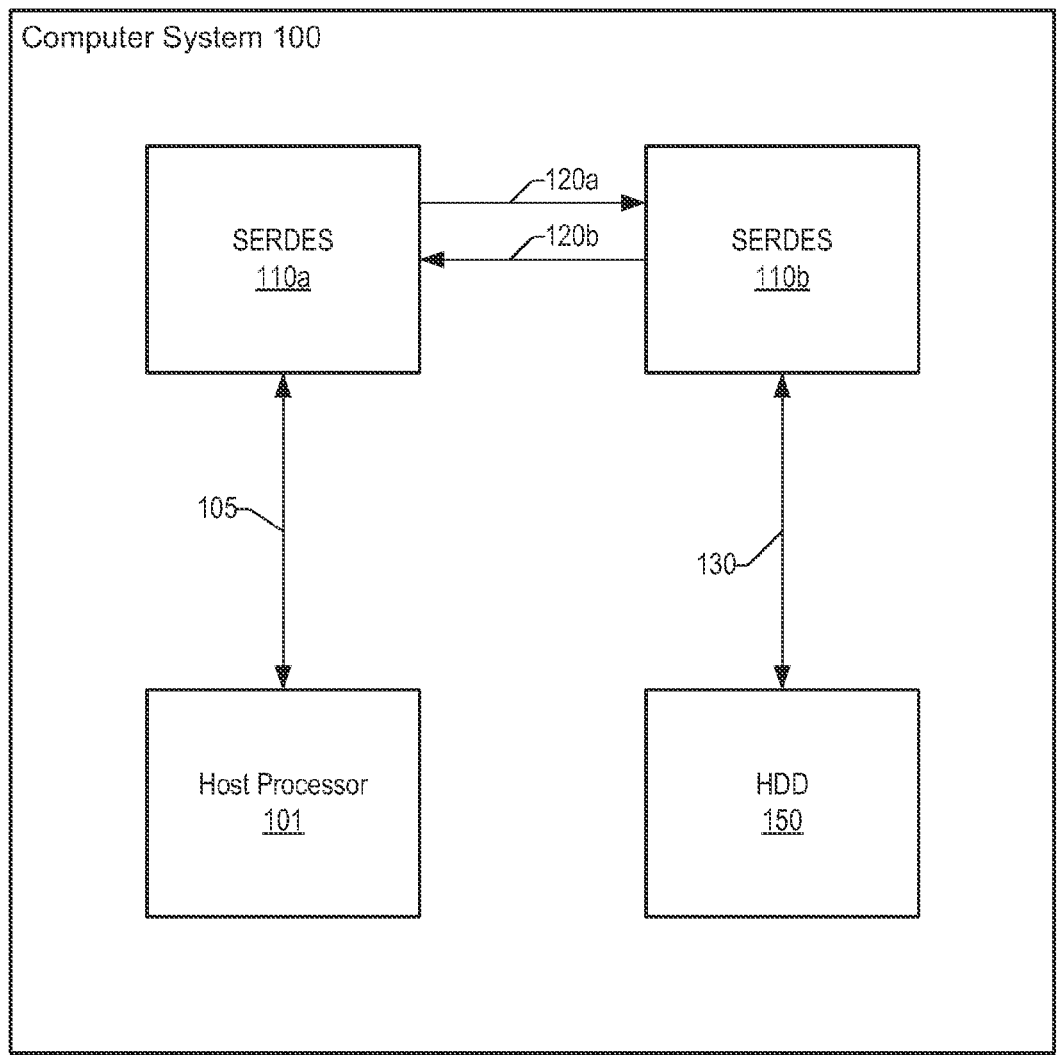
FIG. 1 is a generalized block diagram illustrating an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Some examples of applications utilizing SERDES circuits include wireless network routers, fiber optic communication systems, gigabit Ethernet systems, flat panel displays, and cache coherence links in chip multi-threading (CMT) systems with multiple nodes. An example of a hard disk drive (HDD) connected to a processor motherboard through a high speed serial interface, utilizing SERDES circuits is provided as an illustration of clock and data recovery methods for SERDES circuits. The high speed serial interface may be any suitable standard such as, e.g., Serial Advance Technology Attachment (SATA) or Universal Serial Bus 3.0 (USB 3.0), or may be a proprietary high speed interface. Although a HDD connection through a high speed serial interface is used as an example, the steps and techniques described may be applied to other systems such as gigabit Ethernet or Fibre Channel networks.

In view of the above, methods and mechanisms for improving the reliability and accuracy of clock and data recovery within systems using serialized data transmission are desired. Various embodiments of a serialized data transmission system are described in this disclosure. The embodiments illustrated in the drawings and described below may provide techniques for improving the reliability and accuracy of clock and data recovery within a serialized data transmission system.

SERDES Network Overview

Referring to FIG. 1, a generalized block diagram illustrating one embodiment of a computing system 100 is shown. Computing system 100 may include host processor 101, coupled to SERDES block 110a through interface 105. SER-DES block 110a may be coupled to SERDES block 110b through communication channels 120a and 120b. SERDES block 110b may be coupled to HDD 150 through interface 130.

Host processor 101 may request a file from HDD 150. In some embodiments, host processor 150 may be a motherboard including one or more processor cores. In some embodiments, the processor cores may implement any suitable instruction set architecture (ISA), such as, e.g., SPARC, PowerPC™, or x86 ISAs, or a combination thereof. Host processor 101 may include one or more bus interfaces, such as, e.g., interface 105, which may allow host processor 101 to communication to other functional blocks within SoC 100 such as, SERDES block 110a for example. Interface 105 may be a parallel bus interface of any suitable width, such as, for example 16, 32, or 64 bits wide.

Host processor 101 may issue a command to SERDES block 110a through interface 105 to initiate a connection to HDD 150 through SERDES block 110b. SERDES block 110a and SERDES block 110b may include circuits configured to transmit and receive data from parallel interfaces such as interfaces 105 and 130 using serial channels 120a and 120b. SERDES blocks 110 may be configured to transport data at rates of 3 Gbit/s or higher. SERDES blocks 110 may include only differential data pairs with no dedicated clock signal between SERDES block 110a and SERDES block 110b. Since SERDES blocks 110 may not be physically located on the same circuit board, they may not share a single clock source. Therefore, SERDES blocks 110 may require the transmitting block to encode a clock signal within the data stream.

Serial channels 120 may conform to one or more high speed serial standards and include a copper wire cable with multiple conductive paths coupled between SERDES blocks 110a and 110b. Serial channel 120a may be a unidirectional path from SERDES block 110a to SERDES block 110b and conversely serial channel 120b may be a unidirectional path from SERDES block 120b to SERDES block 120a. In other embodiments, other standards may be employed, and serial channels 120 may be bidirectional. A channel may also be referred to as a lane. Parallel data is serialized prior to transmission across a respective channel/lane.

SERDES block 110a may receive the command from host processor 101 to initiate a connection to SERDES block 110b. To initiate a connection, a process referred to as channel training, or link training, may be utilized to configure serial channel 120a. SERDES block 110a may send a stream of bits to SERDES block 110b. SERDES block 110b may sample the stream of bits until data timing requirements can be derived. Once timing requirements are derived, SERDES block 110b may calculate one or more characteristics that will be sent to SERDES block 110a to be used to adjust how SERDES block 110a transmits data to SERDES block 110b. This process may be referred to as precursor adaptation, and may be used to overcome various factors that negatively impact the clarity of data transmitted from SERDES block 110a to SERDES block 110b, such as EMI generated from the system or occurring within the environment, as well as effects that may be created when a high speed signal travels along a copper wire, such as signal reflection. More details regarding signal quality will be discussed later.

Once serial channel 120a has been initiated and configured, the process may repeat to initiate and configure serial channel 120b, with SERDES block 110b sending the stream of data bits and SERDES block 110a receiving the data, deriving data timing requirements and calculating a precursor. Once both serial channels 120 are configured, host processor 101 may send a command through SERDES blocks 110 to HDD 150, for example, to read a file stored on HDD 150. SERDES block 110b may receive the command from host processor 101 via SERDES block 110a and transport the command to HDD 150 through interface 130.

Interface 130 may be a parallel interface of any suitable width necessary to read data from HDD at a high enough rate to sustain the effective data rate of the SERDES link. Interface 130 may be 32, 64, 128, or more bits wide to read HDD 150 at an adequate data rate.

HDD 150 may receive the command from SERDES block 110b and respond with the data from the requested file. In some embodiments, status data or handshaking protocols may be sent before the requested data. HDD 150 may be any suitable hard disk drive from any manufacturer, such as, for example, Seagate or Western Digital. Although a hard disk drives is used as an example, any storage medium may be contemplated, such as, e.g., solid-state drives or optical drives.

It is noted the embodiment of FIG. 1 is merely an example for the purpose of demonstrating a SERDES link. Other forms of SERDES links are possible and contemplated, such as, for example, a gigabit Ethernet network or a USB 3.0 connection between a computer and a digital camera.

SERDES Interconnection

Figure 2:
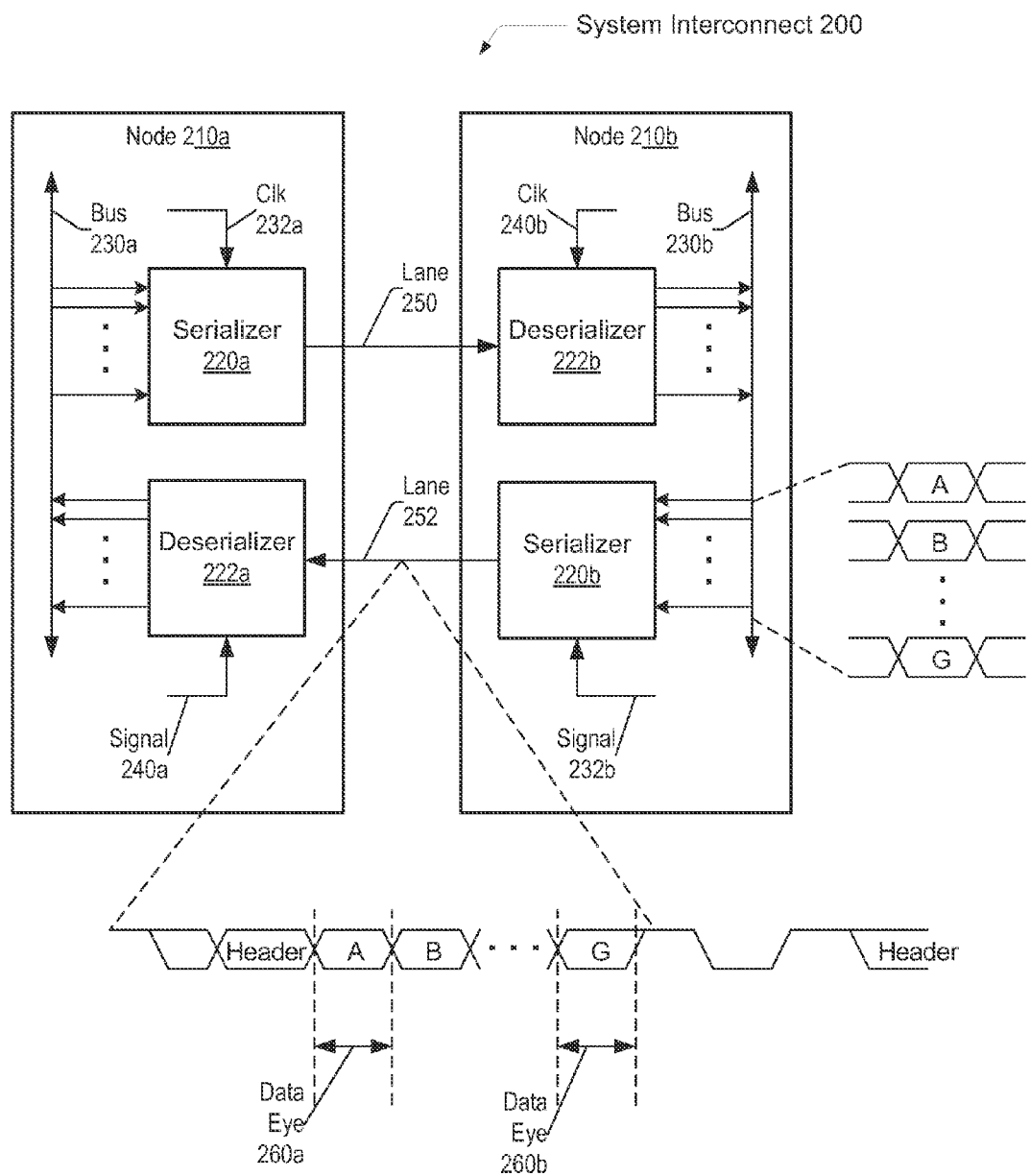
FIG. 2 is a generalized block diagram illustrating an embodiment of a system interconnect.

Referring to FIG. 2, a generalized block diagram illustrating one embodiment of system interconnect 200 is shown. The system includes nodes 210a-210b. Although two nodes are shown in FIG. 2, other embodiments may include a different number of nodes. Nodes as described and used herein, may include functional blocks, functional units, routers, chips or chipsets, data transmission buffers such as a transmitter buffer and a receiver buffer, and processors and so forth in a system. Node 210a and node 210b may correspond to SERDES 110a and SERDES 110b from FIG. 1, respectively. The nodes 210a-210b may use differential signals and differential transmission lines between them. Functional and control blocks and units used for the data acquisition and processing are not shown for ease of illustration. The nodes 210a-210b utilize lanes 250 and 252 for communication.

Parallel information within a given one of the nodes 210a-210b may include control, status, address, parity, and data values. The parallel information may be placed on a respective one of the buses 230a-230b. The parallel information may be serialized by a transmitter block before transmission on a given one of the lanes 250 and 252. The serialized information may be de-serialized by a receiver block upon reception. For example, regarding lane 250, node 210a is the transmitter block and node 210b is the receiver block. Regarding lane 252, node 210b is the transmitter block and node 210a is the receiver block.

Serial transmission protocols may be used on lanes 250 and 252, such as a low voltage differential signaling protocol (LVDS) or differential current mode logic (CML). SERDES circuits may be used by nodes 210a-210b to perform high-speed serialized data transmission. For example, the node 210a uses serializer 220a and deserializer 222a to form a SERDES circuit. The node 210b uses serializer 220b and deserializer 222b to form a SERDES circuit. Although a single SERDES circuit is shown for each of the nodes 210a-210b, other embodiments may include a different number of SERDES circuits.

SERDES circuits transform wide bit-width, single-ended signal buses and compress them to a few, typically one, differential signal that switches at a much higher frequency rate than the wide single-ended data bus. SERDES circuits may allow a large amount of data to be moved point-to-point. One of multiple SERDES architectures may be selected to perform the high-speed serialized data transmission. For example, the parallel clock SERDES architecture, the embedded clock bits SERDES architecture, the 8-bit/10-bit (8b/10b) or comma encoded SERDES architecture, and the bit interleaving SERDES architecture are some examples of SERDES architectures to use for data transmission.

In the embodiment shown, the SERDES circuits within the nodes 210a-210b utilize an architecture with embedded clock information. However, another architecture may be selected and used. Node 210b is the transmitter for lane 252. The serializer 220b serializes the parallel information on the bus 230b. The parallel information is generally shown as data A and B-G. The serializer 220b additionally receives the clock signal 232b. The serializer 222b combines the data A and B-G and the clock signal 232b onto one serial signal pair on lane 252.

In various embodiments, the serialized data word with the data A and B-G have a leading header to indicate valid data is being transmitted. In some embodiments, the serialized word may not contain an explicit clock signal. The serializer 220b may continually send data to the deserializer 222a for frequent tuning and updates for both the data and clock recovery circuits. The header may indicate when valid data is being transmitted. The deserializer 222a may utilize one of various algorithms for recovering the explicit data and implicit clock information in the serialized data words being received. The deserializer 222a may attempt to sample the serialized words in a manner to determine the width of the data eyes in the serialized word. A data eye is a name for a range of sample times and sample voltage thresholds inside of which a stream of data bits may be correctly read. This may also be referred to as a data valid time. The data eyes 260a-260b are two representative data eyes in the serialized word. The deserializer 222a may detect deviations from the expected width of a given data eye and an expected amplitude of received data signals. The deviations may be used to adjust data and clock recovery circuits and to determine clock jitter, clock phase differences, clock frequency drifts, and so forth. The clock data recovery (CDR) circuits in the deserializer 222a may make adjustments on internal clock phases based on received data serialized words and place the sampling signal 240a transition edge in the middle of received data eyes to maximum the timing margin. The deserializer 222b may perform similar steps.

The SERDES circuits attempt to place the transitioning edges of the receiving clock signals in the middle of the data eyes, such as data eyes 260a-260b, for maximum timing margin. Due to channel loss, reflection and crosstalk, the received data serialized words at the deserializers 222a-222b may be significantly distorted. The receiver circuits may recondition and equalize the received signals to maintain a reasonable bit error rate (BER), i.e., the number of bits received with the wrong value versus the number of total bits received. The equalization settings may be adapted and may be based on the channel properties. Once locked, the deserializer 222a recovers the serialized data values in the serial stream.

An appreciable amount of time is consumed to initialize and configure the SERDES circuits before high-speed data communication begins. To initialize a connection, a process referred to as channel training may be utilized to configure lanes 250 and 252. To initialize lane 252 for example, serializer 220b may send a stream of bits to deserializer 222a. The series of bits may be known to both node 210a and node 210b in advance. In some embodiments, the stream of bits may be a consistent string of bits and may be repeated as necessary until the training is complete. In other embodiments, the stream of bits may be the output of a deterministic function, such as a pseudo-random bit sequence, which may be sent continuously until training is complete. Deserializer 222a may sample the stream of bits until the beginning and end of the data eye can be derived.

During the configuration time, internal phase locking circuits, such as, e.g., phase-locked-loops (PLLs), and clock data recovery (CDR) circuits are stabilized and reach a locked state. Duty cycle corrector (DCC) circuits and phase generators are adjusted. Phase interpolators (circuits for adjusting the timing of the clock edges) are adjusted by CDR circuits to place the transitioning edges of sampling circuits in the middle of the data eyes. Equalization circuits start to recondition the signals to maximize the eye margin and to reduce the BER.

A portion of the parameters determined during the initialization and configuration may be relatively time invariant values. This time invariant set of parameters may be used to determine a time variant set of parameters and vice-versa. The determination process may be a recursive process. In some embodiments, after the time invariant set of parameters is determined, this set may be stored in persistent storage. The persistent storage maintains the stored data through a power down mode, such as a mode with a respective clock signal disabled. In other embodiments, the time invariant set of parameters is stored in persistent storage in response to receiving a power down indication. In yet other embodiments, each of the time invariant and the time variant set of parameters are stored in persistent storage.

The time invariant set of parameters may be determined to be associated with the channel properties of the lanes 250-252. Therefore, the time invariant set of parameters may take an appreciable amount of time longer to settle than the time variant set of parameters. The time variant set of parameters associated with clock data recovery may be may be faster to adapt and settle. For example, millions of cycles may be consumed for determining the time invariant set of parameters, whereas a few thousand cycles may be consumed for determining the time variant set of parameters. After turning off the lanes 250-252, a subsequent power up or awakening operation may occur. During the awakening operation, the stored time invariant set of parameters may be used as initial values for the configuration steps, thereby significantly reducing the time consumed for adapting and settling final values. In contrast, the time variant set of parameters may be reinitialized for the configuration steps. Since initial values are used for the time invariant set of parameters, the delay to begin using the lanes 250-252 for data transport may be greatly reduced. In some embodiments, the time variant set of parameters may be stored in persistent storage and used as initial values during a power up operation. However multiple factors may have changed, such as chip temperature, which cause the initial values to lose benefit.

The illustration and description of FIG. 2 are presented as an example of a system interconnect. In other embodiments, various features and functional blocks may differ or be present in different quantities.

Differential Signal Data Eye

Figure 3:
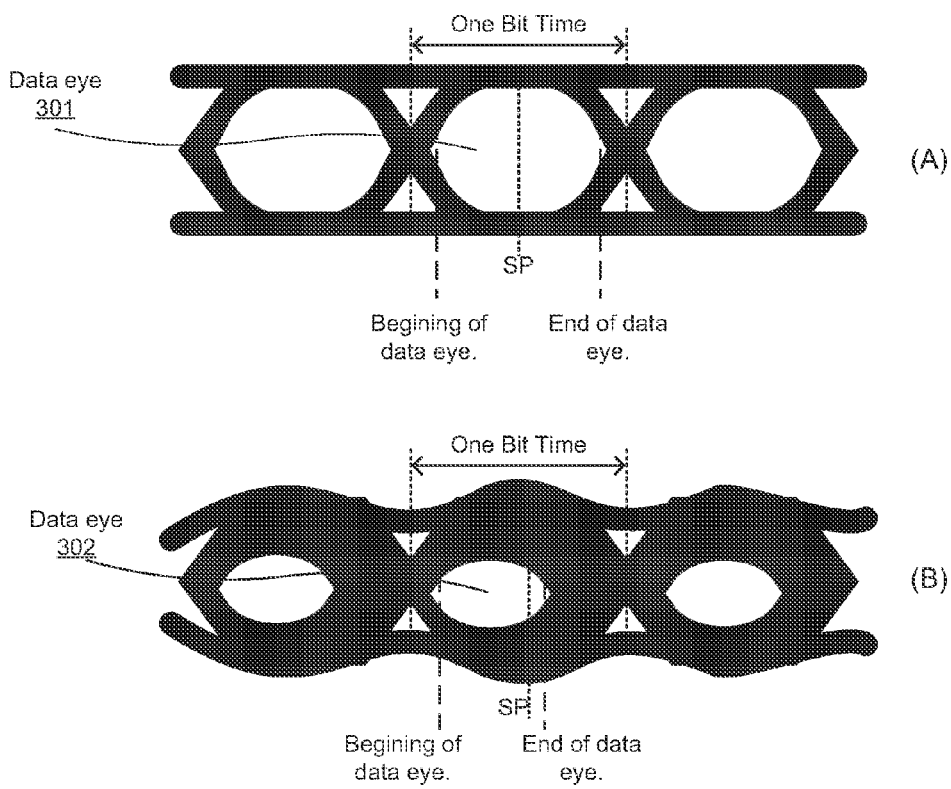
FIG. 3 is a representation of a timing diagram illustrating two embodiments of a data eye from serialized data transmissions.

Turning now to FIG. 3, a representation of a timing diagram of two embodiments of a data eye from serialized data transmissions is illustrated. These timing diagrams represent the voltage of the differential data lines over time for many data bits as may be received by a deserializer, such as deserializer 222a shown in FIG. 2. The thickness of the black lines illustrates the range of the voltage of the differential data lines due to various factors that may couple noise into the lines or create jitter from bit-to-bit over time. In timing diagram 3-A, a data stream is illustrated with a large well-defined data eye 301, i.e., the white space in the middle. Generally speaking, the larger and more well-defined a data eye is, the lower the BER and more reliable the communications may be.

In this example, the space from the beginning of data eye 301 to the end of data eye 301 is large compared to the overall bit time. A large window is available for deserializer 222a to set sampling signal 240a as described above. Sampling signal 240a may be set to align with a sampling point (SP) midway between the beginning and end of the data eye.

Conversely, in timing diagram 3-B, a data stream is illustrated with a smaller, less well-defined data eye 302. As mentioned, various factors that can couple noise into the lines and/or create jitter from bit to bit over time may create much more variance in the voltage output of the differential data lines, which may result in data eye 302 being shorter and narrower. This smaller data eye 302 may make defining the beginning and end of the eye much more difficult for deserializer 222a. If timing diagrams 3-A and 3-B represent the same input to deserializer 222a at different points in time, it may be seen that a sampling point (SP) set to be in the middle of data eye 301 would be near the end of data eye 302, possibly resulting in a large BER.

It is noted FIG. 3 is merely an example of data eye timing diagrams. In various embodiments, data eyes may be observed in a variety of shapes and sizes based upon the characteristics of an individual SERDES link. For example, speed of the bit data rate, format of the data, clock jitter, EMI, impedance of the connection, and length of the connect are just a few factors that may determine the actual shape of a data eye in any SERDES link.

BER Sample Set Examples

Figure 4:
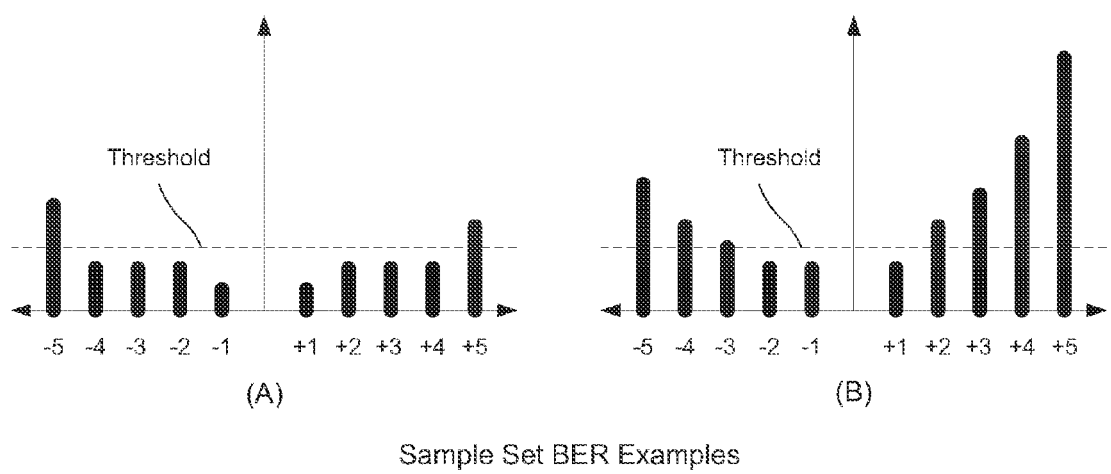
FIG. 4 is an illustration of two graphs of BER samples in an embodiment of system interconnect.

Turning now to FIG. 4, two example graphs are illustrated to demonstrate how BER values at various sampling points may appear. Graph A and graph B in FIG. 4 may represent BER distributions for two different data eyes, such as, for example, data eye 301 and data eye 302 in FIG. 3. In some embodiments, the graphs may represent calculated BER values from a link training step in which deserializer 222a collected samples up to 5 steps before an initial sampling point and up to 5 steps after the initial sampling point. Each step may be a uniform offset from the initial sampling, or in other embodiments, the steps may vary. Multiple data bits may be sampled at each step in order to collect enough data to calculate a BER. The negative numbers may represent the sets of samples taken before the initial sampling point and the positive numbers may represent the sets of samples taken after. The dashed line may represent a threshold value the BER values are to be judged against.

In some embodiments, Graph A may correspond to samples taken on data eye 301. From graph A, it can be seen that both the positive and negative BER values from samples taken 4 or fewer steps from the initial sampling point may all be below the given threshold. However, both BER values from the samples taken 5 steps from the initial sampling point may be above the threshold. In this example, the BER from the samples taken 5 steps before the initial sampling point may be slightly higher than the BER from the samples taken 5 steps after the initial sampling point. In some embodiments, deserializer 222a may set the sampling point after the initial sampling point since the +5 BER is lower than the −5 BER. In other embodiments, since both the +5 and −5 BERs exceeded the threshold and the +4 and −4 BERs did not, deserializer 222a may leave the sampling point at the initial sampling point.

Graph B may, in some embodiments, correspond to samples taken on data eye 302. In graph B, it can be seen that both the +1 and −1 BERs do not exceed the threshold. However, the +2 BER exceeds the threshold while the −2 BER does not. Since the closest BER that exceeds the threshold is the +2 BER, deserializer 222a may set the sampling point before the initial sampling point. In some embodiments, to determine how much to move the sampling point away from the initial sampling point, deserializer 222a may evaluate some or all BER values to determine an appropriate adjustment for the sampling point.

The examples of FIG. 4 are merely for the purposes of illustration. It various other embodiments, it is contemplated that other sampling methods may be used in place of or in conjunction with the illustrated sampling method. Measured results may differ from the results depicted in the aforementioned graphs for various reasons, such as, e.g., inaccuracies in test equipment, and the like.

Clock and Data Recovery (CDR) Methods for Asynchronously Clocked Links

Method for Data Eye Sampling

Figure 5:
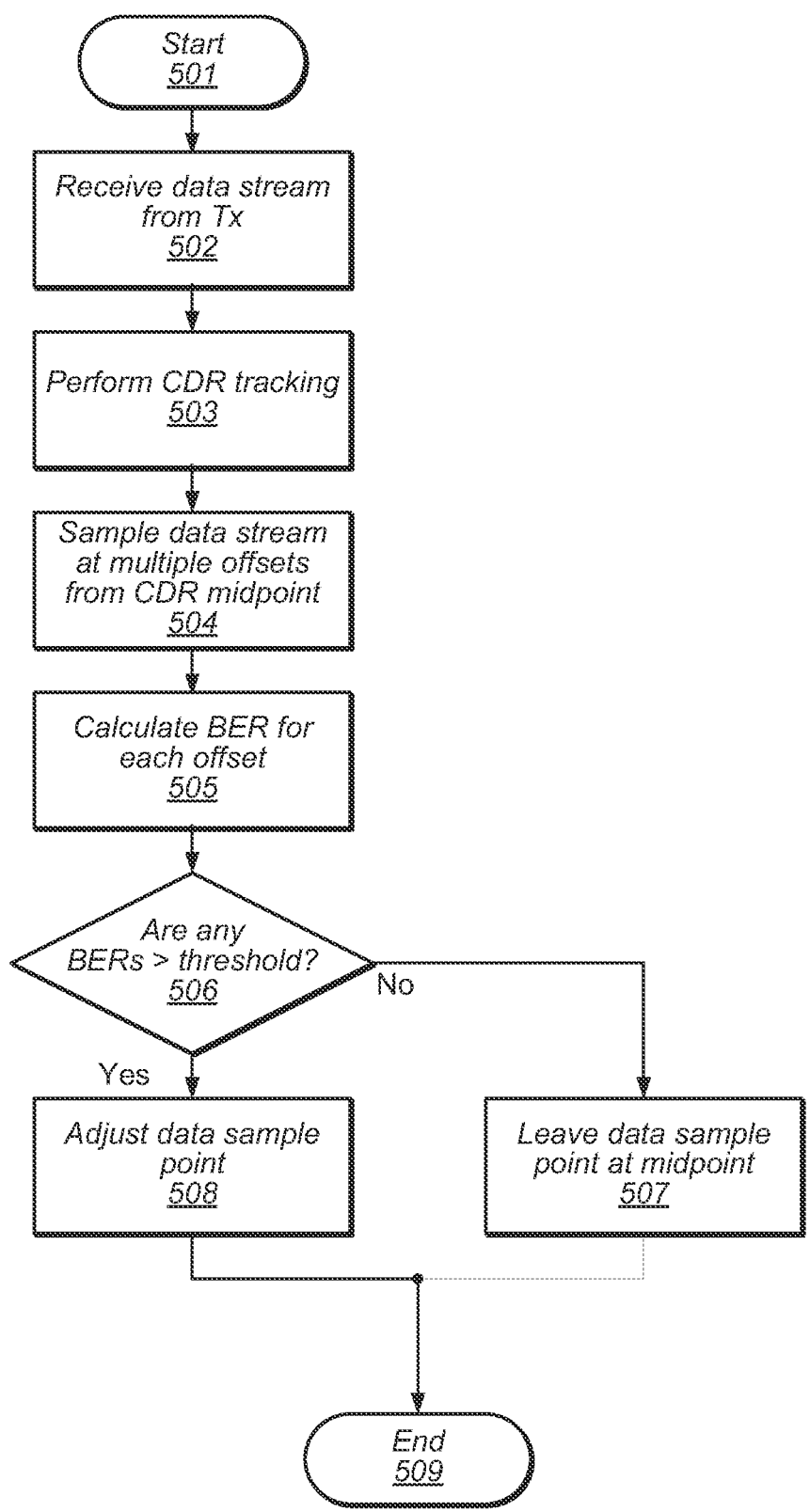
FIG. 5 is a flow diagram illustrating an embodiment of a first method for clock and data recovery.

Turning now to FIG. 5, an embodiment of a method is illustrated for analyzing a data eye by a deserializer to establish a sampling point for the data eye. This method may, in some embodiments, be used as part of a link training process. This method may be employed with a SERDES system such as, for example, system interconnect 200 as illustrated in FIG. 2 and a data eye as illustrated in FIG. 3. The method may be used in a SERDES connection in which the data is transmitted asynchronously from node 210b to node 210a. In further embodiments, this method may also be used if node 210b utilizes Spread Spectrum Clocking (SSC). Referring collectively to FIG. 2, FIG. 3 and FIG. 5, the method may begin in block 501.

Deserializer 222a may receive a bit stream from serializer 220b (block 502). In some embodiments, this bit stream may be a stream of values known by both deserializer 222a and serializer 220b. In other embodiments, the data values included in the bit stream may be determined algorithmically, such as, e.g., a pseudorandom bit stream (prbs). In such cases, deserializer 222a may be able to predict the received values after an initial number of bits have been read.

Deserializer 222a may then perform CDR tracking to identify an initial sampling point for a data eye, such as data eye 301 (block 503). CDR tracking may allow deserializer 222a to analyze the bit stream and adjust the sampling point such that the sampling point occurs in the middle of data eye 301. Deserializer 222a may sample the bit stream at multiple points to determine the limits of data eye 301. The identified sampling point may be used as a baseline reference point for other steps of the method.

Deserializer 222a may sample the bit stream by adjusting the phase of a source clock, such as sampling signal 240a, to move an active edge of sampling signal 240a to align to different points of the bit stream (block 504). In other embodiments, another sampling signal may be generated and phase-shifted from a fixed-phase reference clock, such that the edge of the phase-shifted sampling signal aligns to different points of the bit stream. In some embodiments, deserializer 222a may read multiple bits at one sample point, save the read values to a buffer or to a local memory, and then increase or decrease the current phase setting by an offset and repeat the sampling process until enough samples have been collected across predetermined limits to calculate a BER for each sample point. In other embodiments, multiple sampling signals may be employed to sample each sampled bit at multiple sample points, which, in some embodiments, may allow for the samples to be collected faster. More details on sampling the bit stream will be presented below.

The sampling points may be chosen such that an equal number of offsets are sampled both before (negative offsets) and after (positive offsets) the initial sampling point. In some embodiments, the values read at each sampling point may be grouped together such all values for each sampling point are tracked, thereby establishing a series of sample sets, one sample set for each offset from the initial sampling point.

The collected sample sets may be processed in order to calculate a BER for each sample set (block 505). In some embodiments, the processing may be performed by logic within deserializer 222a and, in other embodiments, by logic external to deserializer 222a. The processing may involve comparing the sampled bit values to expected bit values and evaluating how many matches occurred at each sample point.

Once a BER has been calculated for each sample set, the BERs may be analyzed to determine if any of the BER values exceed a predetermined threshold (block 506). When none of the sample sets have a BER value exceeding the threshold, the method may move to block 507. If the BER value for one or more sample sets does exceed the threshold, then the method may move to block 508. In some embodiments, the threshold may be a fixed value. In other embodiments, the threshold may be set dynamically before or during the initialization and precursor adaptation. Adjusting the threshold may, in various embodiments, provide a capability to account for periods when environmental conditions are not optimal, such as, for example, when excessive EMI is present, possibly from an active wireless network in the area, or when temperature and/or supply voltage is not optimal. During times when conditions are less optimal and BERs are higher, a higher threshold may be required to create more differentiation between BERs on opposite sides of the initial sampling point, potentially avoiding a situation in which all or most BER values exceed the threshold. Conversely, at times when BERs are low due to favorable conditions, a lower threshold may also help increase differentiation between BER values, possibly avoiding a situation in which all or most BER values are below the threshold.

When none of the sample sets have a BER value exceed the predetermined threshold, the data sampling point may be left at the initial sampling point (block 507). In other embodiments, the sampling point may be adjusted a minimum amount before or after the initial sampling point based on previous adjustments. For example, if the previous three adjustments have been offset before the initial sampling point, but the offset decreased each successive time, then this may indicate the transmitter clock is drifting towards a slower frequency. In such an embodiment, instead of leaving the sampling point at the initial sampling point, an adjustment may be made to move the sampling point slightly after the initial sampling point in anticipation of the transmitter clock continuing to drift slower. Such an embodiment may be useful in cases where the transmitter clock is using Spread Spectrum Clocking (SSC). In SSC systems, the transmitter clock frequency may predictably drift slower and then faster, as discussed earlier, to minimize impact from EMI emissions.

When one or more sample sets have BER values exceeding the predetermined threshold, deserializer 222a may adjust the sample point based upon those sample sets (block 508). Various methods for adjusting the sampling point based on the sampled BER values, such as, e.g., the method described below in more detail in reference to FIG. 6, may be employed. After adjusting the sampling point, the method may end in block 509.

It is noted that the method illustrated in FIG. 5 is merely an example and that, in other embodiments, different operations may be included. Although the operations illustrated in the method of FIG. 5 are depicted as being performed in a sequential fashion, in some embodiments, some or all of the operations may be performed in parallel or in a different sequence.

Method for Checking CDR Tracking Quality Responsive to Clock Drifting or SSC

Figure 8:
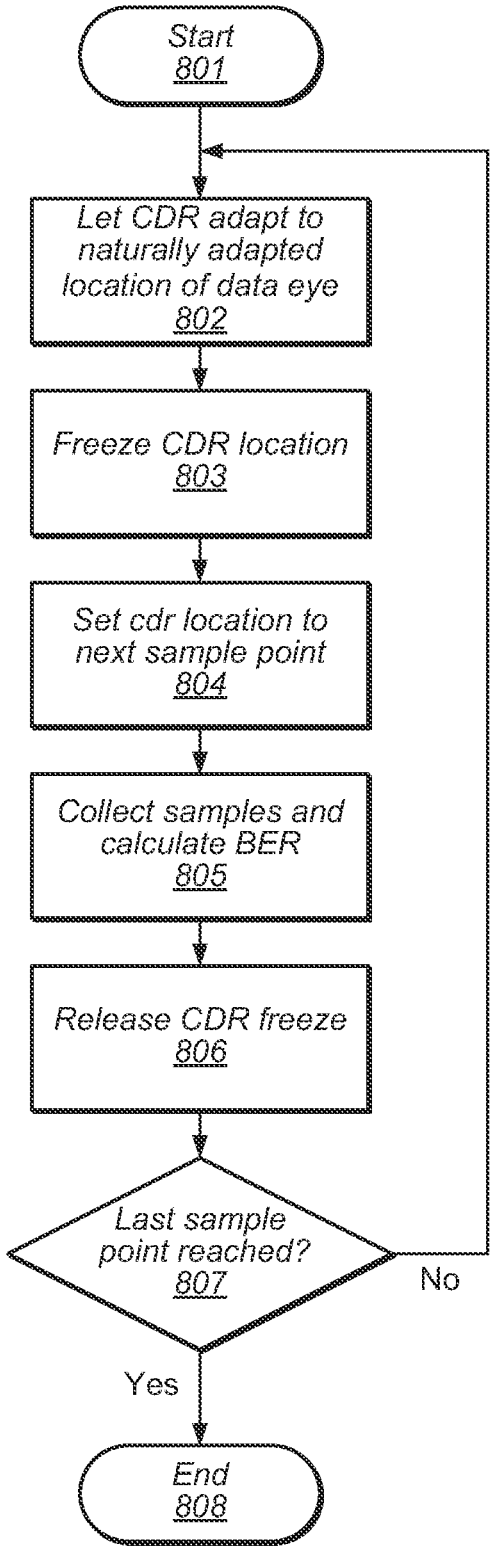
FIG. 8 is a flow diagram illustrating an embodiment of a fourth method for clock and data recovery.

Switching to FIG. 8, an embodiment of a method is illustrated for sampling the data stream at multiple offsets. This method may, in some embodiments, correspond to block 504 in FIG. 5. This method may be employed with a SERDES system such as, for example, system interconnect 200 as illustrated in FIG. 2 and a data eye as illustrated in FIG. 3. The method may, in various embodiments, be included as part of a "lock and release" process in which the CDR may establish a starting point for data sampling and then the CDR lock is released and the data sampling point may be adjusted by other logic. Referring collectively to FIG. 2, FIG. 3 and FIG. 8, the method may begin in block 801.

Deserializer 222a may enable CDR tracking until a naturally adapted location of the data eye is determined (block 802). The naturally adapted location may correspond to a midpoint of the data eye. In other embodiments, the naturally adapted location may correspond to a sampling point that provides a lower BER. Upon determining the naturally adapted location of the data eye, deserializer 222a may sample a series of data bits. The sampled data bits may be saved in a buffer for later use. In other embodiments, a BER may be calculated to establish a baseline value.

The method may lock (also referred to herein as "freeze") the CDR at the naturally adapted point of the data eye (block 803). With the CDR frozen, other logic, such as, for example, logic within deserializer 222a may be able to adjust the data sampling point to various other times within the data eye. In some embodiments in which SSC or asynchronous clocking may be used, the duration of the CDR freeze has to be limited since the naturally adapted points may change with time. By freezing the CDR for a short period of time, the effect of the clock drifting may not have visible impact to the final result. Moreover, the sampling point may, during the period when the CDR is frozen, be moved to various points within the data eye and BER data may be collected for each sampling point. If the CDR is not frozen, then CDR tracking may adjust the sampling point while BER data is being collected, which may not produce the desired results. In some embodiments, deserializer 222a may adjust the data sampling point. In other embodiments, logic outside of deserializer 222a may be used to adjust the data sampling point.

Deserializer 222a may set the data sampling point to one of a series of offsets from the naturally adapted location of the data eye where the sampling point is frozen (block 804). In some embodiments, the offsets may be predetermined. In other embodiments, the offsets may be determined dynamically based on a measured frequency of the data clock or in other embodiments, based on previously calculated BERs. In some embodiments, an equal number of offsets may be used to move the sampling point both before and after the naturally adapted location of the data eye. In other embodiments, an unequal number offsets may be used before and after the naturally adapted location.

After the data sampling point has been set, deserializer 222a may collect a new set of samples (block 805). The new sample set may be stored in a buffer for use in a later step. In other embodiments, a BER may be calculated for the current sampling point and compared to the previously established baseline value or to other previously collected BER values. The BER comparisons may be used in various embodiments to determine a next offset value for a next sampling point.

Once the samples from a data sampling point have been collected, the CDR freeze may be released (block 806). In some embodiments in which SSC or asynchronous clocking may be used, there may be a need to release the CDR freeze and allow the CDR tracking to adapt to any frequency changes that may occur in serializer 220b due to the SSC or asynchronous clocking. The CDR freeze may, in various embodiments, be released after data is collected for each sampling point. In other embodiments, data may be collected from more than one sampling point before the CDR freeze is released. The data sampling point may be reset to the naturally adapted location of the data eye calculated by the last CDR adaptation. In other embodiments, the sample point may not be reset and the next CDR adaptation may start from the previously used offset.

A determination may be made if the final decremental step has been reached (block 807). Deserializer 222a may adjust the sampling point to fixed number of offsets. In other embodiments, deserializer 222a may determine a number of offsets based upon parameters such as, for example, the frequency of the data clock. The final offset may, in various embodiments, be determined by a BER threshold level of the data samples collected. If the last offset has not been reached, then the method may return to step 802. Otherwise, if the last offset has been reached, the method may end in block 808.

It is noted that the method illustrated in FIG. 8 is an example and that, in other embodiments, different operations may be included. Although the operations illustrated in the method of FIG. 8 are depicted as being performed in a sequential fashion, in some embodiments, some or all of the operations may be performed in parallel or in a different sequence. For example, data sampling points may be incremented first then decremented afterwards.

Method for Adjusting the Sampling Point

Figure 6:
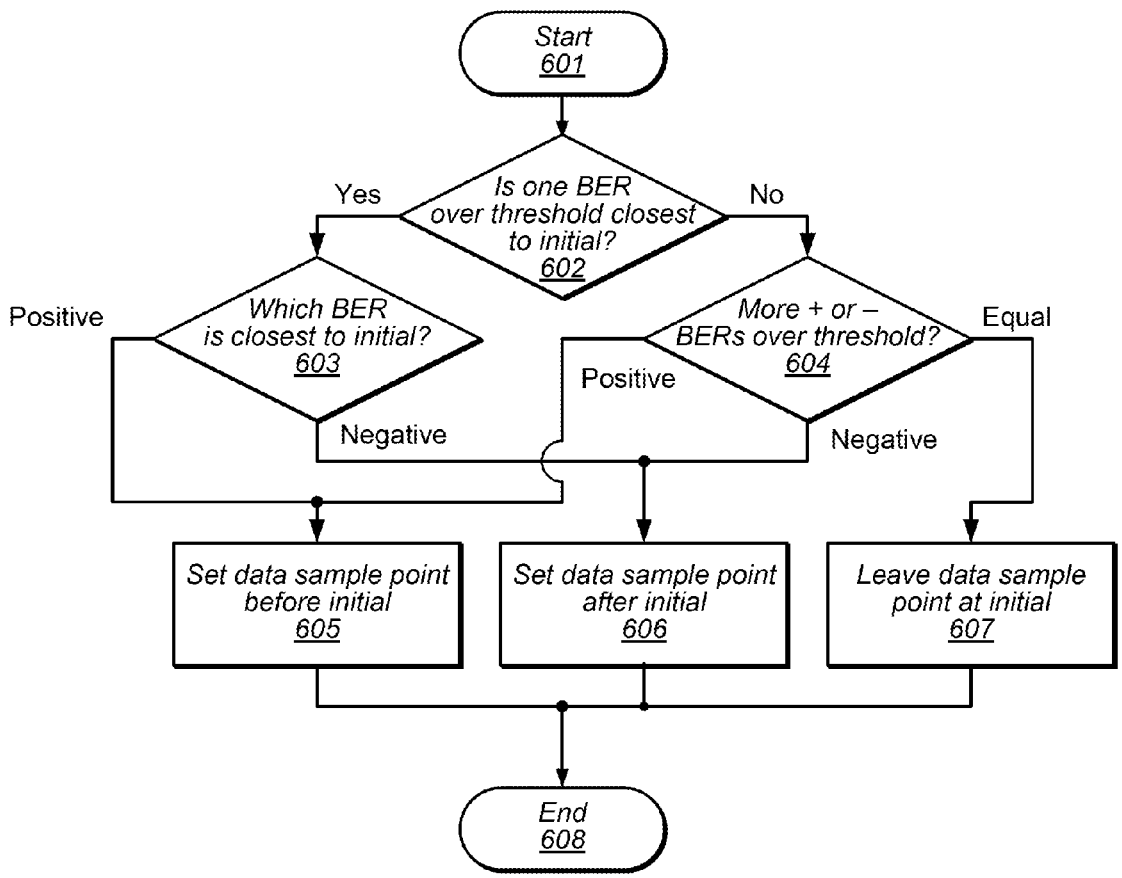
FIG. 6 is a flow diagram illustrating an embodiment of second method for clock and data recovery.

Turning to FIG. 6, a method is illustrated which may correspond to an embodiment for adjusting a sample point based upon the BER values of one or more sample sets. This method may be a part of link training for a serial communications link such as system interconnect 200 in FIG. 2. The method may, in some embodiments, correspond to block 508 from the method of FIG. 5. The sample sets discussed in this method may correspond to sample sets such as the sample sets represented by graph A and graph B illustrated in FIG. 4. Referring collectively to FIG. 2, FIG. 4, and FIG. 6, the method may begin in block 601 with deserializer 222a having determined at least 1 sample set has a BER value greater than a threshold.

Deserializer 222a may determine if one sample set with a BER exceeding the threshold is closer to the initial sample point than the other sample sets (block 602). If there is one BER value exceeding the threshold closest to the initial sampling point, then the method may move to block 603. Otherwise, the method may move to block 604. Using the example in graph A, none of the sample sets from −4 to +4 may exceed the threshold. However, both the −5 and the +5 BER values exceed the threshold. If the +5 and the −5 values represent offsets an equal distance from the initial sampling point, then neither one is closer and the method may move to block 604 in the graph A example. In graph B, sample set −3 is the closest BER value to exceed the threshold on the negative side of the initial sampling point and sample set +2 is the closest BER to exceed the threshold on the positive side of the initial sampling point. If the +2 sample set is closer to the initial sampling point than the −3 sample set, then there is one BER closest and the method may move to block 603 in the graph B example.

If one sample set with a BER exceeding the threshold is determined to be closer to the initial sampling point than the other sample sets with a BER exceeding the threshold, then deserializer 222a may determine if the closest BER exceeding the threshold is on the positive or negative side of the initial sampling point (block 603). If the closest BER is on the positive side, then the method may move to block 605. If the closest BER is on the negative side, then the method may move to block 606. Continuing with the graph B example, since the +2 sample set is closer to the initial sampling point than the −3 sample set, deserializer may determine that the closest BER exceeding the threshold is on the positive side and the method may move to block 605.

If no sample set with a BER exceeding the threshold is determined to be closer to the initial sampling point than the other sample sets with a BER exceeding the threshold, then deserializer 222a may determine if either the positive side or the negative side has more sample sets with BER values exceeding the threshold (block 604). If the positive side has more BERs exceeding the threshold, then the method may move to block 605. If the negative side has more BERS exceeding the threshold, then the method may move to block 606. In some embodiments, if the positive and negative sides have an equal number of BERs exceeding the threshold, then the method may move to block 607. In other embodiments, deserializer 222a may determine which side, positive or negative, has the higher total BER including all sample sets. In alternate embodiments, deserializer 222a may total the BER values on each side for only the sample set in which the BER exceeds the threshold and in further embodiments, deserializer 222a may only look at the BER values for the closest sample sets in which the BER exceeds the threshold.

Referring back to the graph A example, both the positive side and the negative side have only one sample set apiece, +5 and −5 respectively, in which the BER exceeds the threshold. In some embodiments, the method may move to block 607 in this case. In other embodiments, deserializer 222a may total the BER values for the positive side and for the negative side. In the graph A example, the negative side would have a higher total BER value and the method would move to block 606.

If the positive side was selected in either block 603 or block 604, then deserializer 222a may set the sampling point before the initial sampling point (block 605). Deserializer 222a may use the BER values from some or all of the sample sets to determine a suitable sampling point. After setting the sampling point, the link training may be complete and deserializer 222a may be ready to receive data from serializer 220b and the method may end in block 608.

If the negative side was selected in either block 603 or block 604, then deserializer 222a may set the sampling point after the initial sampling point (block 606). As disclosed for block 605, deserializer 222a may use the BER values from some or all of the sample sets to determine a suitable sampling point. Again, the link training may now be complete and deserializer 222a may be ready to receive data from serializer 220b and the method may end in block 608.

If the number of samples with BER values exceeding the threshold were determined to be equal in block 604, then deserializer 222a may leave the sampling point at the initial sampling point (block 607). As previously disclosed, in other embodiments, deserializer 222a may employ other combinations of the sample set BER values to determine a suitable sampling point. Once again, the link training may now be complete and deserializer 222a may be ready to receive data from serializer 220b and the method may end in block 608.

It is noted that, in various embodiments, the BER values of the sample sets may be used in methods other than those disclosed herein to determine a suitable setting for the sampling point. For example, in addition to the methods disclosed, deserializer 222a may look for a delta between BERs for successive sample sets to determine if there is a sharp increase as the samples are taken further away from the initial data point. This may be an indication of reaching a beginning or end of a data eye. The example of graph A illustrates a sharp increase moving from −4 to −5 and from +4 to +5 which may indicate a well formed data eye such as data eye 301. Contrast this to the example of graph B where the increase from −4 to −5 may not be much different than the increase from −3 to −4 which may indicate a noisier, less well formed data eye such as, for example, data eye 302.

The method depicted in the flowchart of FIG. 6 is an example. In other embodiments, different operations and different orders of operations are possible and contemplated. In the illustrated example, deserializer 222a is presented as performing the determinations and calculations associated with analyzing the various sample sets. It is known that these determinations and/or calculations may be performed in conjunction with or alternatively by other functional blocks in a given system.

Method for Limiting Use of a Given Data Sampling Point

Figure 7:
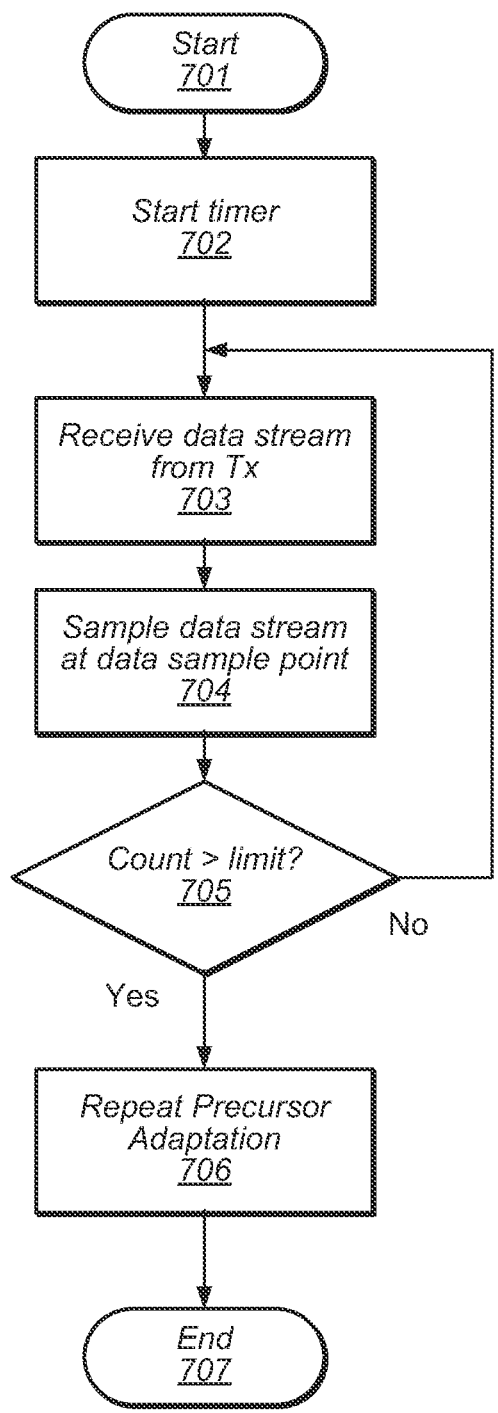
FIG. 7 is a flow diagram illustrating an embodiment of a third method for clock and data recovery.

Moving to FIG. 7, an embodiment of a method for maintaining quality of a data eye by a SERDES connection is illustrated. This method may be employed by a SERDES connection such as, for example, system interconnect 200 as illustrated in FIG. 2. Referring collectively to FIG. 2 and FIG. 6, the method may begin in block 701. The method may be utilized after link training has completed and may be employed during transfers of actual data between SERDES nodes, such as from node 210b to node 210a. This method may be used in a SERDES connection in which the data is transmitted asynchronously from node 210b to node 210a. In further embodiments, this method may also be used if node 210b utilizes Spread Spectrum Clocking (SSC).

Node 210a may start a timer once the initialization and configuration of lane 252 has been completed (block 702). Over time, due to environmental changes and/or the use of asynchronous transmission clocks, the quality of data eye 301 may degrade, and in some embodiments, may resemble data eye 302. The center of the data eye may also shift due to use of an SSC transmission clock. In some embodiments, a timer may be used to track how long lane 252 has used the current settings, including the data sampling point. In other embodiments, instead of a timer, a counter may increment for every bit or every word received.

A data stream may be received by deserializer 222a from serializer 220b (block 703). This data stream may correspond to actual data being transfer between functional units, such as, for example, from host processor 101 and HDD 150 in FIG. 1. The data stream may be encoded, such as, for example, an 8b/10b encoding as described above. In other embodiments, other encoding formats may be used.

Deserializer 222a may sample the data stream using sampling signal 240a and other settings as determined by an initialization and configuration step (block 704). As data is sampled, deserializer 222a may form words from the data stream and may send these words to a host on bus 230a. The formed words may also be used by node 210a to determine an ongoing BER.

The method may then depend on the current timer count (block 705). As mentioned above, system interconnect 200 may reset the current operating parameters of lane 252 after a set amount of time. In some embodiments, a timer is used to track elapsed time from the most recent initialization of lane 252. In other embodiments, counters, state machines or any other suitable timekeeping circuit may be employed. If the current timer count does not exceed a limit established either before or during the initialization process, then the method may return to block 703 and continue to receive data. However, if the current timer count does exceed the limit, then the method may move to block 706.

When the timer exceeds the established limit, then the link training process may be repeated (block 706). In some embodiments, node 210a may send a message to node 210b via serializer 220a to indicate the allowed time period for using the current precursor settings has expired and a new link training and precursor adaptation should be performed. In other embodiments, deserializer 222a may begin the training process using the current settings as a starting point, while other embodiments may start from the same defaults each time an training is performed. The method may end in block 707.

In some embodiments, the time limit for using a given set of precursor settings may be a fixed time limit. In other embodiments, the time limit may be adjusted prior to performing an initialization or during an initialization. The time limit may be adjusted based on previous BER calculations and/or measurements taken by other functional blocks in the system of operating conditions such as, e.g., temperature and power supply voltage level. An advantage of adjusting the time limit may be the capability to account for periods when environmental conditions are not optimal, such as, for example, when excessive EMI is present, possibly from an active wireless network in the area, or when temperature and/or supply voltage is not optimal. During times when conditions are less optimal and BERs are higher, a shorter time limit may be employed to increase the frequency of precursor adaptations and thereby potentially reduce BERs. Conversely, at times when BERs are low due to favorable conditions, longer time limits may be used which may result in higher bandwidth due to more time spent transmitting data and less time performing precursor adaptations.

In the embodiment presented, the receiver node is discussed as being responsible for tracking time. However, it is considered that the transmitter node, such as for example, node 210b for lane 252, may be responsible for tracking elapsed time and initiating a new initialization and precursor adaptation procedure. In such an embodiment, the receiving node may still calculate an ongoing BER for the received data.

It is noted that the method of FIG. 7 is merely illustrative and is not intended to limit the scope of the embodiments. Although the steps of the method are depicted as being performed in a sequential order, in other embodiments, some of the steps may performed in parallel and or in a different order.

It is noted that the above-described embodiments may be implemented, in part or in whole, by software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or nonvolatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a host processor;
a transmission unit coupled to the host processor, wherein the transmission unit is configured to receive data from the host processor and serially transmit a first stream of data bits dependent upon the received data; and
a receiving unit coupled to the transmission unit, wherein the receiving unit is configured to:
receive the first stream of data bits;
determine a respective sampling point for each one of a plurality of offsets;
lock to the respective sampling point;
sample one or more data bits from the first stream of data bits at the locked respective sampling point dependent upon the corresponding one of the plurality of offsets to create a respective one of a plurality of sample sets;
determine a Bit Error Rate (BER) for each one of the plurality of sample sets; and
determine a data sampling point dependent upon the determined BER for each one of the plurality of sample sets.

2. The system of claim 1, wherein the transmitting unit is further configured to serially transmit a second stream of data bits, and wherein the receiving unit is further configured to receive the second stream of data bits, and modify the data sampling point responsive to a determination that a predetermined amount of time has elapsed from a beginning of the reception of the second stream of data bits.

3. The system of claim 2, wherein the receiving unit is further configured to adjust the predetermined amount of time dependent upon data from at least one sensor located within the system.

4. The system of claim 2, wherein to modify the data sampling point responsive to the determination that the predetermined amount of time has elapsed from the beginning of the reception of the second stream of data bits, the transmission unit is further configured to serially transmit a third stream of data bits, and the receiving unit is further configured to:
receive the third stream of data bits;
determine the respective sampling point for each one of a second plurality of offsets;
lock to the respective sampling point;
sample one or more data bits from the third stream of data bits at the locked respective sampling point dependent upon the corresponding one of the second plurality of offsets to create a respective one of a second plurality of sample sets;
determine a BER for each one of the second plurality of sample sets; and
adjust the data sampling point dependent upon the determined BER for each one of the second plurality of sample sets.

5. The system of claim 1, wherein the receiving unit is further configured to release the lock to the respective sampling point responsive to the completion of the creation of the respective one of the plurality of sample sets.

6. The system of claim 1, wherein to determine the data sampling point dependent upon BER of each one of the plurality of sample sets, the receiving unit is further configured to determine if a first portion of the plurality of sample sets has a higher BER than a second portion of the plurality of sample sets, wherein each sample of the sample sets included in the first portion of the first plurality of sample sets corresponds to a positive offset, and each sample of the sample sets included in the second portion of the first plurality of sample sets corresponds to a negative offset.

7. The system of claim 1, wherein the first stream of data bits includes a pseudorandom bit sequence.

8. A method for operating a receiver unit, comprising:
receiving a first stream of data bits;
determining a respective sampling point for each one of a plurality of offsets;
locking to the respective sampling point;
sampling one or more data bits of the first stream of data bits at the respective sampling point dependent upon the corresponding one of the plurality of offsets to create a respective one of a plurality of sample sets;
calculating a Bit Error Rate (BER) for each one of the plurality of sample sets; and
setting a data sampling point dependent upon the calculated BER for each one of the plurality of sample sets.

9. The method of claim 8, further comprising:
receiving a second stream of data bits; and
modifying the data sampling point responsive to a determination that a predetermined amount of time has elapsed from a beginning of the reception of the second stream of data bits.

10. The method of claim 9, further comprising adjusting the predetermined amount of time dependent upon one or more previously calculated Bit Error Rates (BERs).

11. The method of claim 9, further comprising adjusting the predetermined amount of time dependent upon data from at least one sensor.

12. The method of claim 8, wherein the plurality of offsets includes an equal number of negative and positive offsets.

13. The method of claim 12, further comprising determining a subset of the plurality of sample sets dependent upon the calculated Bit Error Rate (BER) for each sample set, wherein each calculated BER of each sample set of the determined subset exceeds a predetermined threshold.

14. The method of claim 13, wherein setting the data sampling point comprises comparing the offset values corresponding to each sample set of the plurality of sample sets determined to have a calculated Bit Error Rate (BER) exceeding the predetermined threshold, and setting a modified data sampling point dependent upon the sample set of the plurality of sample sets with a smallest offset.

15. A device for receiving serial communications comprising:
an input buffer configured to receive a first stream of data bits;
a sampling circuit coupled to the input buffer, wherein the sampling unit is configured to:
determine a respective sampling point for each given one of a plurality of offsets; and
sample one or more data bits of the first stream of data bits at the respective sampling point dependent upon the corresponding one of the plurality of offsets to create a respective one of a plurality of sample sets; and
a control circuit coupled to the sampling circuit, wherein the control circuit is configured to:
calculate a Bit Error Rate (BER) for each of the plurality of sample sets; and
establish a data sampling signal dependent upon the calculated BER for each one of the plurality of sample sets.

16. The device of claim 15, wherein the input buffer is further configured to receive a second stream of data bits, and wherein the control circuit is further configured to modify the data sampling signal responsive to a determination that a predetermined amount of time has elapsed from a beginning of the reception of the second stream of data bits.

17. The device of claim 16, wherein to modify the data sampling signal responsive to the determination that the predetermined amount of time has elapsed from the beginning of the reception of the second stream of data bits, the input buffer is further configured to receive a third stream of data bits; and the sampling circuit is further configured to:
determine a respective sampling point for each given one of a second plurality of offsets; and
sample one or more data bits of the third stream of data bits at the respective sampling point dependent upon the corresponding one of the second plurality of offsets to create a respective one of a second plurality of sample sets.

18. The device of claim 15, wherein the plurality of offsets includes an equal number of positive and negative offsets, and wherein the control circuit is further configured to determine a subset of the plurality of sample sets dependent upon the calculated BER of each sample set, wherein the calculated BER of each sample set of the determined subset exceeds a predetermined threshold.

19. The device of claim 18, wherein establishing the data sampling signal comprises comparing the offset values corresponding to each sample set of the subset of the plurality of sample sets, and establishing the data sampling signal dependent upon a comparison of a number of positive and negative offsets of each sample set of the determined subset.

20. The device of claim 18, wherein the control circuit is further configured to adjust the predetermined threshold dependent upon one or more previously calculated Bit Error Rates (BERs).

* * * * *

UNITED STATES PATENT AND TRADEMARK OFFICE
CERTIFICATE OF CORRECTION

Page 1 of 1

PATENT NO.         : 9,141,459 B2
APPLICATION NO.    : 14/146904
DATED              : September 22, 2015
INVENTOR(S)        : Su et al.

It is certified that error appears in the above-identified patent and that said Letters Patent is hereby corrected as shown below:

In the specification

Column 15, line 54, delete "and or" and insert -- and/or --, therefor.

Signed and Sealed this
Twenty-fourth Day of May, 2016

Michelle K. Lee
*Director of the United States Patent and Trademark Office*